United States Patent [19]

Maycock et al.

[11] 4,300,304
[45] Nov. 17, 1981

[54] DETACHABLE NIBBLER STICK

[75] Inventors: E. Frank Maycock, Omaha; John L. Rayer, Valley, both of Nebr.

[73] Assignee: Plastilite Corporation, Omaha, Nebr.

[21] Appl. No.: 137,880

[22] Filed: Apr. 7, 1980

[51] Int. Cl.³ .............................................. A01K 93/00
[52] U.S. Cl. ...................................... 43/44.87; 43/17; 43/44.95
[58] Field of Search ................... 43/17, 43.1, 44.87, 43/44.92, 44.95

[56] References Cited

U.S. PATENT DOCUMENTS

| | | |
|---|---|---|
| 2,500,078 | 3/1950 | Ingram . |
| 2,607,153 | 8/1952 | Lambach . |
| 2,962,831 | 12/1960 | Cameron ................................ 43/17 |
| 3,142,930 | 8/1964 | Lambach ........................... 43/44.95 |
| 3,204,363 | 9/1965 | Dunham ....................... 43/44.95 X |
| 3,323,247 | 6/1967 | Murray . |
| 3,832,795 | 9/1974 | Wolfe . |
| 3,918,193 | 11/1975 | Schneider . |

Primary Examiner—James G. Smith
Attorney, Agent, or Firm—Henderson & Sturm

[57] ABSTRACT

A nibbler stick which is conveniently mounted and dismounted on a conventional push-button type fishing float for interchangeability. A broadened base of the stick portion of a nibbler float has a channel along a diameter across which is a bridge. The upper retaining hook of the push-button float fits into the channel and over the bridge to hold the nibbler stick firmly atop the float as the spring within the push-button float urges the push-button against the bottom of the nibbler stick base. Other embodiments reveal threaded mounts, friction mounts and bonded mounts.

3 Claims, 8 Drawing Figures

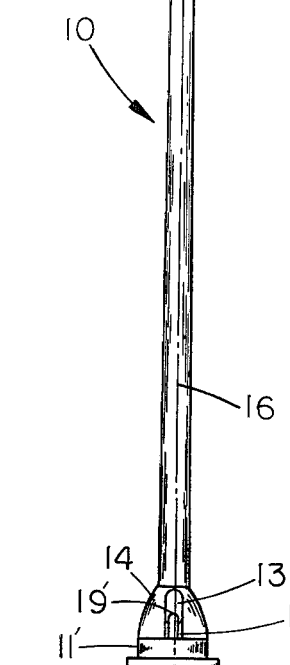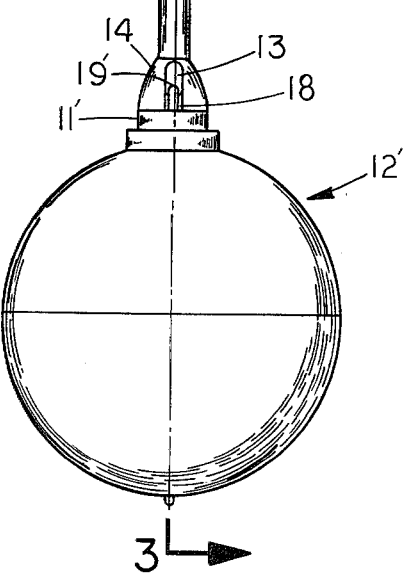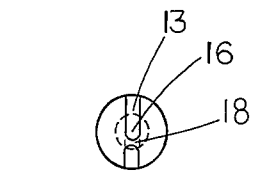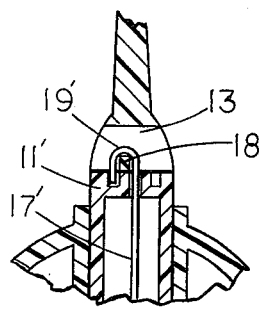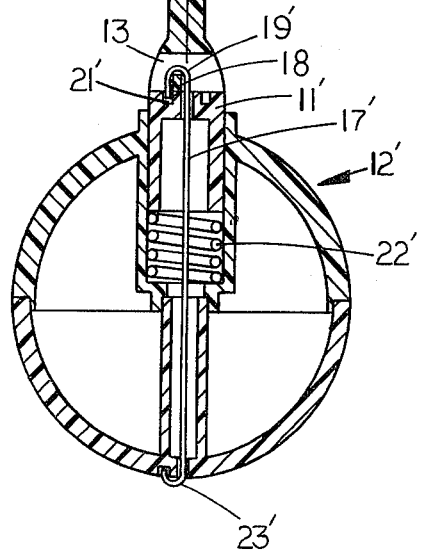

DETACHABLE NIBBLER STICK

BACKGROUND OF THE INVENTION

1. Field of the Invention

This invention relates generally to fishing floats of the nibbler type, also known as "pan fish" floats, and more particularly to such a float comprised of an interchangeable stem member which can be easily mounted and dismounted on a conventional push-button type float.

2. Description of the Prior Art

A fishing float serves various purposes, of which two principal ones are holding the bait a pre-determined distance below the water surface and visually indicating the hidden action of a fish upon the bait. It is the latter purpose to which a nibbler-type float is specifically directed. As indicated by this name as well as its alternative name, "pan fish" float, a nibbler float is most useful when the sought-after fish is either or both a type of fish which habitually nibbles at bait before taking it or is so small that its action when translated to an ordinary float would be barely discernable. The length of the stem above the bulbous part of the float serves to present a stem tip, usually brightly painted, which will move further laterally than any point on the bulbous part of the float. Thus when a fish is merely nibbling at the bait before it pulls it downwards or laterally, or when the fish is so small it cannot accomplish either, even after it has taken the bait, the exposed tip of a long stem will signal such occurrences.

This advantage of a nibble stem is more important when the water surface is disturbed by wind and/or wave action, thus causing an ordinary float to move around and bob up and down independently of any fish. However, wind also acts upon the stem itself, and, in particular, a wind with periodic gusts will act upon the stem without materially changing the wave pattern, thus creating a condition where a thinner, shorter stem may be preferable.

Interest by fishermen in smaller fish or "pan fish" has been increasing in recent years as population increases and migration out of urban areas has greatly diminished the incidence of larger fish in conveniently located waters and fishermen have coincidentally discovered the unique science and challenge of taking an adequate catch pan-sized fish. Conditions encountered by fishermen after leaving their home base and arriving at a fishing site vary unpredictably. Such variations in conditions include sizes and varieties of pan fish, water surface conditions, wind velocity and quality (gusty or not gusty), sun and sky condition (cloudy, partly cloudy, location of sun in sky), and the effect of bait types on the action of the fish. Those fishermen intent on pursuing "pan fish" or those who wish to keep open such an option if larger fish are either not present or not biting, have taken to carrying with them a large selection of nibbler-type floats including various stem lengths, stem diameters, float sizes and shapes (round, pear, or oblong), and sundry combinations of all of these. This need for a large selection of nibbler-type floats presents problems of storage space, investment, and equipment maintenance for fishermen who engage in this type of fishing.

Additionally, all of the variables listed above are always subject to sudden and unpredictable change. Whenever such a change occurs, a fisherman must weight the difficulty and time lost in changing his nibbler float to more perfectly accommodate the new conditions against the continued use of a less than ideal float and the probability that the previous conditions will re-occur.

In addition, the conventional, popular and easily attached push-button type float is not generally available with a nibbler stem. Since a push-button type float is quick and easy to install on a line, the need for frequent changing of types of nibbler stems is most readily satisfied by providing stems which can be efficiently mounted and dismounted on conventional push-button floats.

To meet the needs of nibbler-type float fishermen, vast varieties of single piece stems and float combinations are available in the stores and some fishermen appear to have nearly as large a variety in their tackle boxes. The present inventor at one time, made an interchangeable stem for mounting on an especially adapted push-button float. This stem was made of injection-molded plastic and had inserted in its lower end a projecting wire hook for connecting with the wire hook of a spring-biased push-button float which had a push-button specially formed to receive the stem, but otherwise conventional.

This type of interchangeable stem has not been made since about 1967 due to high labor cost of hand-inserting the projecting wire hook in the liquid plastic before it hardened and was ejected from the mold, the danger in placing the hand so near to automatic injection-molding equipment, and the lack of flexibility resulting from the requirement that only a push-button float which was specially adapted could be used.

SUMMARY OF THE INVENTION

In the present invention a detachable and interchangeable nibbler stick is disclosed which can be easily mounted and dismounted on a conventional push-button fishing float, such as taught by U.S. Pat. No. 3,142,930, Reissue No. 26,096 to F. A. Lambach. This type of fishing float has an axial retaining member, usually of wire, with hooks at either end. This member is held in place by a push-button which is spring-biased away from the shell of the float and by the seating of the return portions of each hook in two substantially polarly-opposed depressions, a lower one in the form of a hole in the shell of the float and the other in the form of a ring in the top center of the push-button.

By holding the hook seated in the lower hole in place and depressing the push-button, the other hook is exposed above the top of the push-button. According to one aspect of this invention, a nibbler stem is provided which has a channel in a base which is otherwise a substantially planar surface perpendicular to the longitudinal axis of the stem, said channel permitting access to said exposed hook. Across the channel is a bridge which has a lower side flush with the base surface. The channel and the bridge are so located that when the exposed hook is inserted into the channel, the stem may be shifted slightly to align its longitudinal axis with said axial member of the float, after which when the push-button is released the once-exposed hook will then seat itself across the bridge with its return portion still projecting somewhat into the ring-shaped depression in the top of the push-button. When thus mounted, the longitudinal axis of the stem and the axial member of the float will remain aligned. The stem will be held firmly against the top of the push-button.

It is necessary that the fishing line be held in place by the lower hook which is seated in the hole in the shell of the float before mounting the stem, because the other hook will be employed to hold the stem against the push-button. This is not a disadvantage when a push-button float is used as part of a nibbler float as in the present invention, since the advantage of double security of running the line through both hooks of such a float has no merit it is used to fish for small pan-sized fish. Actually it is an advantage of this invention over the prior art that stems can be frequently and easily interchanged without removing the float from the line or otherwise interferring with paraphenalia carried by the line.

Another related advantage of the invention is that the feature of a push-button float which permits easy relocation of the float on the line is retained after any detachable stem is mounted on the float, or interchanged with another stem.

An object of the present invention is to save storage space for fishermen, and fishing equipment distributors and manufacturers.

Another object is to reduce investment in nibbler floats by fishermen and distributors and manufacturers of fishing equipment.

A further object of the invention is to increase the enjoyment, success, and challenge, thus encourageing more participation, in fishing for pan-sized fish.

Still another object of the invention is to expand the utility of the push-button fishing float.

Other objects, advantages and novel features of the present invention will become apparent from the following detailed description of the invention in conjunction with the accompanying drawings.

BRIEF DESCRIPTION OF THE DRAWINGS

FIG. 1 is a side view of the preferred embodiment of the nibbler stick mounted atop a conventional push-button fishing float;

FIG. 2 is a bottom view of the preferred embodiment of the nibbler stick when dismounted;

FIG. 3 is a cross-sectional view of the preferred embodiment of the nibbler stick when mounted, taken along line 3—3 of FIG. 1;

FIG. 4 is a cross-sectional fragmentary view of the preferred embodiment of the nibbler stick when mounted;

DESCRIPTION OF THE PREFERRED EMBODIMENTS

Figure 5:
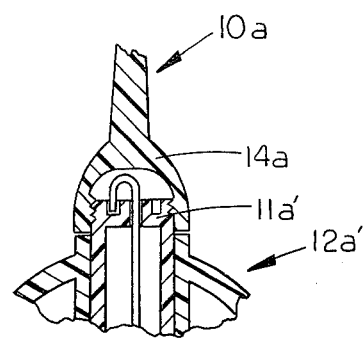
FIG. 5 is a cross-sectional fragmentary view of a second embodiment of the nibbler stick, when mounted.

Referring now to the drawings wherein like reference numerals designate identical or corresponding parts throughout the several views and numbers followed by a prime mark (') referring to the parts of a conventional push-button float, designated generally at 12'; and more particularly to FIG. 1, the nibbler stick designated generally at 10, is depicted as mounted atop the push-button 11' of conventional push-button float 12'. Nibbler stick 10 has a broadened base portion 14 with a flat lower end having a diameter approximately equal in length to most push-buttons. Referring also to FIG. 2, channel 13 is seen as running along a diameter of the float lower end of broadened base portion 14. As can be seen most clearly in FIGS. 2, 3 and 4, adjacent to the intersection of axial center 16 of the nibbler stick, and a distance from it equal to approximately half the diameter of axial retaining member 17', is a bridge 18. The lower side of bridge 18 is flush with the lower end of base portion 14 and its width is such that upper hook 19' of axial retaining member 17' can sit itself around it. There is enough free space above bridge 18 within channel 13 to allow upper hook 19' to move over bridge 18 and sit upon it.

The method for mounting this embodiment of the nibbler stick is best understood by reference to FIG. 3, where the axial hooked retaining member 17' of the float 12' is seen projecting into channel 13, seated over bridge 18, and extending slightly into depression 21' of push-button 11'. After being mounted, spring 22' is depressed an additional amount equal to the depth of bridge 18. Push-button 11' then sits the same distance further into the float, to accommodate the fixed length of retaining member 17'.

To mount the stick in this embodiment one holds the lower hooked end 23' of retaining member 17' in place, as with a thumb, and depresses push-button 11' by holding stem part 24 in the other hand and using it to push push-button 11' downwards. This downwards push is accomplished while the longitudinal axis 16 is substantially parallel with the retaining member 17', bridge 18 is opposite the downwards projection of the upper hook 19' of the retaining member 17' and channel 13 is lined up with and sitting over the top of hook 19'. When the push-button is depressed far enough that the bridge 18 can pass beneath the downwards projection of hook 19' and against the other vertical portion of hook 19' stem part 24 is released and spring 22' is allowed to urge the push-button upwards until hook 19' is firmly seated within channel 13 and over bridge 18. Because bridge 18 is located adjacent to the longitudinal center 16, the stick 10 is centered over the axial member 17'. The nibbler stick is dismounted by reversing these steps.

Another embodiment of the invention is depicted in FIG. 5 where the broadened base portion 14a is shaped like an inverted cup and its interior is threaded for cooperative securement to a modified conventional push-button float 12a'. Float 12a' is conventional in all respects except its push-button 11a' is threaded so as to provide for simple mounting and dismounting of nibbler stick 10a.

Figure 6:
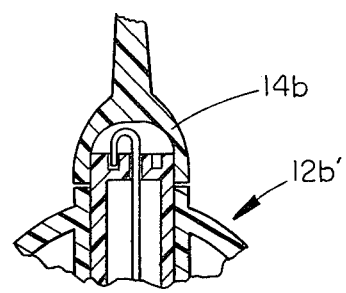
FIG. 6 is a cross-sectional fragmentary view of a third embodiment of the nibbler stick, when mounted.

Yet another embodiment of the invention is depicted in FIG. 6 where the broadened base portion 14b is inverted cup-shaped so as to be secured for mounting and dismounting atop conventional push-button float 12b' by various means, such as being made of a deformable plastic material or by use of a suitable bonding material.

Figure 7:
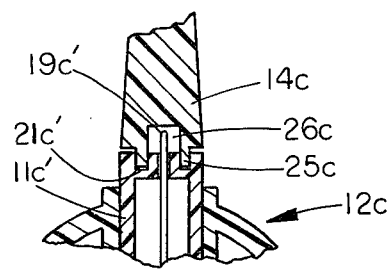
FIG. 7 is a cross-sectional fragmentary view of a fourth embodiment of the nibbler stick, when mounted wherein the protruding end of the upper hook of the retaining member is hidden from view; and, FIG. 8 is a bottom view of the fourth embodiment of the nibbler stick when dismounted.
Figure 8:
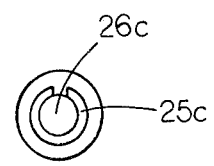

Still another embodiment of the invention is depicted in FIG. 7 and 8 where the broadened base portion 14c has a C-shaped ring 25c protruding beneath its flat lower end and a hollow portion 26c, within ring 25c, extending in to base portion 14c. Ring 25c is inserted into depression 21c' of push-button 11c', so that the projecting end of upper hook 19c' is positioned within the opening of the C-shape, and secured therein by friction. The hollow 26c is then available to accommodate the portion of upper hook 19c' which protrudes above the top of push-button 11c'.

Other modifications and variations of the present invention are possible and it is to be understood that, within the scope of the appended claims, the invention may be practiced otherwise than as herein specifically described.

I claim:

1. A detachable nibbler stick for attachment to a conventional push-button fishing float of a type having a spring-biased push-button held in place by an axial retaining member having retaining hooks at each end comprising a stem wherein the lower end of the stem is substantially flat and oriented transverse the longitudinal axis of the stem with an open channel running along a diameter of said lower end and a bridge crossing the channel adjacent to the center of said end so that the longitudinal axis of the stem will coincide with the axial member of the float when the stem is mounted.

2. The detachable nibbler stick as set forth in claim 1 wherein the nibbler stick is made of injection molded plastic.

3. The method of mounting and dismounting a detachable nibbler stick on a push-button fishing float having an axial retaining member including a lower end formed to sit on the exposed end of the push-button, access means for receiving the push-button retaining hook, and retaining means for seating the hook so that the stem will be held upright atop the float, in which said mounting comprises the steps of depressing the push-button below its retaining hook by applying pressure thereon with the lower end of the nibbler stick while holding the lower hook of the axial member in place and while holding the stick with its longitudinal axis substantially parallel to the polar axis of the float and its access means in a position to receive the retaining hook, moving the nibbler stick laterally until the retaining hook is ready to engage the retaining means, and releasing the pressure on the push-button so that the spring will urge the push-button firmly against the lower end of the nibbler stick and the retaining hook will sit within the retaining means and extend partially within its usual depression atop the push-button and in which said dismounting comprises the identical steps of mounting the nibbler stick in reverse order.

* * * * *